July 16, 1929.   F. H. OWENS   1,720,744
CAMERA
Filed May 17, 1923
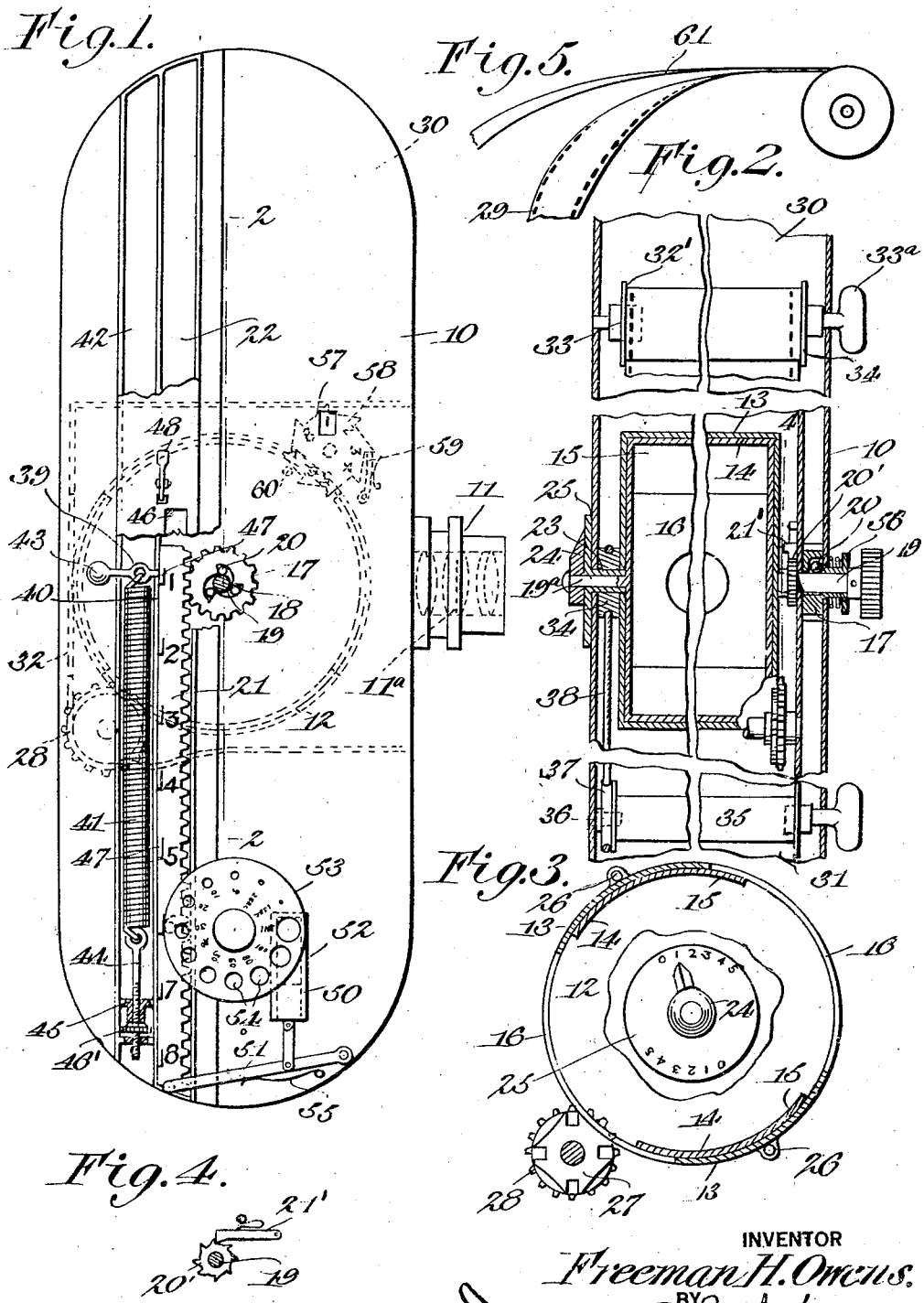

Patented July 16, 1929.

1,720,744

UNITED STATES PATENT OFFICE.

FREEMAN H. OWENS, OF NEW YORK, N. Y.

CAMERA.

Application filed May 17, 1923. Serial No. 639,561.

This invention relates to cameras and has for its primary object the provision of means for causing separate parts of a predetermined length of film to be instantaneously exposed in a continuous operation and in operative time with successive operations of a novel shutter mechanism, and the incorporation with the aforesaid means of mechanism to render the operation thereof entirely automatic and positive of action.

A still further object of the invention is to provide a camera having novel means for causing a single strip of film to be moved across a co-acting automatically actuated shutter in such timed intervals as to cause successive parts of the film to be correspondingly exposed instantaneously in a continuous or sequential operation and for permitting a part of the film to be given a time exposure as the operator desires.

A still further object of the invention is to provide a camera which may be made in various sizes to accommodate films of well-known makes and of standard sizes.

A still further object of the invention is to provide a camera of this character which will be simple of construction and extremely compact.

Another object of the invention is to provide a camera having an intermittently controlled shutter and means for effecting convenient adjustments thereof from outside the casing of the camera.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a side view of the camera with parts in section and parts broken away.

Figure 2 is a vertical section on line 2—2 of Figure 1.

Figure 3 is a conventional illustration of the shutter and operating means therefor.

Figure 4 is a section on line 4—4 of Figure 2, and

Figure 5 is a perspective view of the film.

In the drawings 10 is the casing of the camera and same is provided at one side with a lens system 11 and its iris 11ª of any suitable well-known construction adapted to coact with a barrel shutter 12. This shutter consists of telescoped sections 13 and 14, each having a pair of diametrically disposed arcuate blades 15, 15 and a pair of intervening openings 16, 16. These sections 13 and 14 can be adjusted within each other so that the blades of one section can be turned with respect to the openings 16, 16 of the mating section and thereby adapt the shutter to varying light conditions. This shutter is disposed at one side of the lens and when the camera is at rest, the blades of the shutter sections occupy the positions shown in Figure 1. Said shutter is adapted to be intermittently made to respectively open and close before the lens 11.

The shutter section 13 is provided at one side with a normally free gear wheel 17 having internal clutch surfaces 18 extending about the stub axle 19 of said section 14 and adapted when the gear is rotated in one direction to co-act with said axle and clutch balls or bodies 20 to fix the said wheel 17 to said shaft and cause it to rotate therewith. When the wheel is revolved in an opposite direction the balls are released from their clutching engagement with said surfaces 18 and said axle 19. The axle 19 is provided with a fixed ratchet wheel 20' co-acting with a dog 21' on the adjacent wall of the casing 10. Co-acting with the gear 17 is a rack bar 21 slidable in a guide member 22 exteriorly of the casing 10. The purpose of this arrangement will be referred to hereinafter.

At the opposite wall of the casing 10 the shutter section 13 has its hollow hub 23 mounted to rotate in said wall and extending through said hub is the stub shaft 19ª of the shutter section 14. The said shaft 19ª is formed with a pointer 24 co-acting with a circular graduated dial 25 on the hub 23. Said dial 25 and its co-acting pointer 24 are exposed from outside the casing 10 so that they may be controlled with convenience when it is desired to vary the sizes of the light openings in the shutter.

The shutter section 13 has each of its blades 15 formed with a pin 26 adapted to engage with a star wheel 27 of a coacting sprocket wheel 28, the latter adapted to coact with sprocket holes in the film 29. This film is movable from the top magazine 30 to a lower magazine 31 and over a light excluding film guide 32 in operative alignment with the lens 11 and shutter 12. In this manner, it will be understood that the film is moved intermittently across the lens 11 in operative time with movements of the coacting shutter 12.

In the upper magazine 30 is a removable film spool 32' one end of which having detachable connection with a rotary member 33. In the lower magazine 31 is a removable take-up spool 35 whose co-acting member 36 is provided with a pulley 37 which finds connections with the pulley 34 of the shutter 12 by means of a belt 38. It will now be seen that as the film is intermittently drawn down from the top magazine 30 the same is taken onto the aforesaid spool 35. Except for the means herein stated for transmitting motion from one of the spools to the other, I claim no novelty for the spools and same may be of any suitable well-known construction.

The rack bar 21 is provided with a pin 39 movable in a slot 40 in the adjacent wall of the guide member 22. Connected to this pin is one end of a retractile spring 41 arranged in a housing 42. The pin 39 has a knob or actuating portion 43 which freely slides in one wall of the housing 42 and same is exposed therefrom, as shown. The lower end of the spring 41 is connected with a tensioning screw 44 swiveled at 45 in the housing 42 and having an adjusting wheel 46' exposed from the housing so that it may be readily adjusted as desired.

The guide casing 22 has a sight opening 46 and as shown, the bar 21 has printed thereon at equi-distant points numbers, eight being employed herein and running consecutively from the upper part of the bar to the lower end thereof, the first number being spaced from the sight opening normally for a distance equal to one frame of the film. From this construction it will be appreciated that when the bar 21 is raised to expose a particular one of its numbers from said sight opening 46, the camera is set to expose instantaneously and successively, as many unexposed parts of the film as the exposed number indicates. The bar 21 is provided with a ratchet surface 47 which co-acts with a manually releasable dog 48 exposed from the guide member 22. As the bar 21 is moved to a predetermined position the rack surface thereof freely moves with relation to the gear wheel 17. When the dog 48 is released, however, the rack actuates the gear and causes its friction clutch bodies to establish a binding action between the shaft and said gear and the latter becomes fixed and causes motion to be transmitted to the shutter 12 and the intermittent film mechanism consisting of the star wheel 27 and its sprocket gear 28. When the bar 21 is lifted to the full limit of its movement, the number 8 is visible from the aforesaid mating sight opening and when the bar is released, it is drawn downward in a consistent manner and causes eight frames of the film to be successively drawn past the lens 11 and each frame instantaneously exposed.

In order that resistance may be offered the action of the spring 41 to vary the speed of movement of the co-operating instrumentalities of the camera and permit of the taking of accurate indicated time exposures, I provide a pump 50 whose piston is connected with a lever 51 adapted to coact with the rack bar 21. The cylinder 52 of this pump is associated with a rotary indicator 53 having a circular series of bleed openings 54 of graduated sizes and adapted to singly register with the cylinder to vent same to the atmosphere. When the camera is used for instantaneous exposures, the opening of largest dimensions of the indicator 53 is in registration with the pump cylinder 52. When a time exposure is required, any desired opening of smaller dimension of the indicator is made to register with the cylinder 52. The lever 51 is connected with a spring 55 which functions to move the piston of the pump into its cylinder as soon as the bar 21 is moved upward. When this bar is thus moved to the distance of one frame of the film, the lever 51 is made to obstruct the free downward movement of the bar 21 and it serves through the action of the pump to retard the movement of said bar to such extent that an exposure under the required time is made.

The stub shaft 19 of the shutter 12 is provided with a normally retracted spring pressed sleeve 56 which is freely slidable through one side of the gear 17. When the sleeve is projected into a position to traverse the clutch recesses 18 around the shaft 19, the bodies 20 are rendered inoperative and the rack 21 is free to move over the gear 17 without actuating the shutter. In this manner, excess unexposed part of the film may be paid back to the upper magazine of the camera. The member 34 of the spool 32' carries a handle 33ª in order that the former can be rotated as desired.

From the foregoing, it will be seen that means are provided for obtaining exposure adjustments from a multiplicity of points upon the camera and same may all be actuated from the exterior of the camera. The shutter 12 is normally closed with respect to the lens system 11 and immediately after opening, upon an exposure of the film, said shutter again assumes its closed position automatically. These points of adjustment may again be referred to as consisting of the adjustable barrel shutter 12, the iris of the lens system 11; the screw 44 and its spring 41 and the rack bar 21 and its coacting pump 50.

When the rack bar is set for the taking of the picture or pictures, the ratchet engaging dog of this bar is disengaged with the teeth of this bar to free same. The toothed surface of the bar is formed with a tooth at each of the numbers of said bar, as shown.

A suitable recording device 57 is employed to indicate the number of exposures of the film. This consists of ratchet wheel 58; and a co-cting dog 59; and a pin 60, the latter carried by the shutter 12. In this manner, the recorder is automatic in its action as the shutter revolves. It shall be understood that the film to be used in connection with the camera includes the usual paper protecting covering as shown at 61 in Figure 5.

What is claimed as new is:—

1. A motion picture camera comprising mechanism for intermittently moving a film past an exposure field and mechanism for operating said film moving mechanism for sequentially exposing successive film areas, said mechanism including spring motor, means for manually setting said motor for exposing any one of a series of predetermined lengths of film and a means for releasing the instrumentalities to produce the exposure.

2. A motion picture camera comprising mechanism for intermittently moving a film past an exposure field, means for operating said film moving mechanism for sequentially exposing successive film areas, and instrumentalities for operating said means and adapted to be manually set for exposing any of a number of predetermined lengths of film, said instrumentalities comprising an adjustable operating bar and means for setting the same at will at different points in its length corresponding to the predetermined length of film to be exposed.

3. A motion picture camera comprising mechanism for intermittently moving a film past an exposure field, means for operating said film moving mechanism for sequentially exposing successive film areas, and instrumentalities for operating said means and adapted to be manually set for exposing any of a number of predetermined lengths of film, said instrumentalities comprising an adjustable spring operated slidable bar and means for setting the same at will at different points in its length corresponding to the predetermined length of film to be exposed.

4. A motion picture camera comprising mechanism for intermittently moving a film past an exposure field, means for operating said film moving mechanism for sequentially exposing successive film areas, and instrumentalities for operating said means and adapted to be manually set for exposing any of a number of predetermined lengths of film, said instrumentalities comprising an adjustable operating bar and means for setting the same at will at different points in its length corresponding to the predetermined length of film to be exposed, said bar being provided with exposure indicating indicia.

5. A motion picture camera comprising mechanism for intermittently moving a film past an exposure field, means for operating said film moving mechanism for sequentially exposing successive film areas, and instrumentalities for operating said means and adapted to be manually set for exposing predetermined lengths of film, said instrumentalities comprising an adjustable rack bar which is settable at different points in its length corresponding to the predetermined length of film to be exposed, a pinion meshing with said bar and a clutch connecting the pinion with the film moving means.

6. A motion picture camera comprising mechanism for intermittently moving a film past an exposure field, means for operating said film moving mechanism for sequentially exposing successive film areas, a shutter and shutter shaft operating said means and instrumentalities for operating said shutter and adapted to be manually set for exposing predetermined length of film, said instrumentalities comprising an adjustable rack bar which is settable at different points in its length corresponding to the predetermined length of film to be exposed, a pinion meshing with said rack bar and a one-way clutch between said pinion and said shutter shaft.

7. A motion picture camera comprising mechanism for intermittently moving a film past an exposure field, means for operating said film moving mechanism for sequentially exposing successive film areas, and instrumentalities for operating said means and adapted to be manually set for exposing any of a number of predetermined lengths of film, said instrumentalities comprising an adjustable operating bar and means for setting the same at will at different points in its length corresponding to the predetermined length of film to be exposed and means releasable at will for holding the bar in set position.

8. A motion picture camera comprising an element for engaging motion picture film for intermittently moving the same, a shutter embodying a device for intermittently moving said element, means for operating said shutter for sequentially exposing successive film areas, and instrumentalities adapted to be manually set for operating said means to expose any of a number of a predetermined length of film, said instrumentalities comprising an adjustable operating bar and means for setting the same at will at different points in its length corresponding to the predetermined length of film to be exposed.

9. A motion picture camera comprising an element for engaging motion picture film for intermittently moving the same, a shutter embodying a device for intermittently moving said element, means for operating said shutter for sequentially exposing successive film areas, and instrumentalities adapted to be manually set for operating said means to expose a predetermined length of film, said instrumentalities comprising an adjustable rack bar which is settable at different points in its length corresponding to the predetermined length of film to be exposed, a pinion meshing with said bar and a clutch connecting the pinion with the film moving means.

10. A shutter and intermittent mechanism for motion picture cameras comprising an apertured barrel consisting of sections adjustable in each other, a pin wheel carried by said barrel, a star wheel coacting with said pin wheel, and a sprocket wheel driven by said pin wheel.

11. A motion picture camera comprising mechanism for intermittently moving a film past an exposure field, means for operating said film mechanism for sequentially exposing successive film areas, said means including a motor, instrumentalities for controlling said means to predetermine the length of film to be exposed, said instrumentalities including manually adjustable means for setting said motor at will so as to determine any of a number of predetermined lengths of exposures.

12. A motion picture camera comprising an element for engaging motion picture film for intermittently moving the same, a shutter embodying a device for intermittently moving said element, means for operating said shutter for sequentially exposing successive film areas, said means including a motor; instrumentalities for controlling said means to predetermine the length of film to be exposed, said instrumentalities including manually adjustable means for setting said motor at will so as to determine any of a number of predetermined lengths of exposures.

13. A motion picture camera comprising a mechanism for intermittently moving a film past an exposure field, means for operating said film moving mechanism for sequentially exposing successive film areas, instrumentalities for controlling said means to move a predetermined length of film, and manually adjustable means for setting said instrumentalities in any of at least three positions at will to determine any of at least a like number of predetermined lengths of exposures.

Signed at New York, in the county of New York and State of New York, this 25th day of April, A. D. 1923.

FREEMAN H. OWENS.